United States Patent [19]
Weiss et al.

[11] Patent Number: 5,846,089
[45] Date of Patent: Dec. 8, 1998

[54] MEDICINE CONTAINER FOR INDICATING PATIENT INFORMATION

[76] Inventors: Richard C. Weiss, Eight Forrest Rd., Randolph, N.J. 07869; Howard L. Terriss, 2 Rectory La., Scarsdale, N.Y. 10583

[21] Appl. No.: 612,386

[22] Filed: Mar. 7, 1996

Related U.S. Application Data

[63] Continuation-in-part of Ser. No. 60,336, Jul. 1, 1993, abandoned.

[51] Int. Cl.⁶ .............................. G09B 25/00; G09B 5/04; G09B 25/08
[52] U.S. Cl. ........................... 434/365; 434/319; 340/692
[58] Field of Search ..................... 434/319, 365; 340/692

[56] References Cited

U.S. PATENT DOCUMENTS

| | | | |
|---|---|---|---|
| 5,291,191 | 3/1994 | Moore | 340/825.35 |
| 5,387,108 | 2/1995 | Crowell | 434/319 |

*Primary Examiner*—Robert A. Hafer
*Assistant Examiner*—Vohn Edmund Rovnak
*Attorney, Agent, or Firm*—Myron Amer PC

[57] ABSTRACT

A medicine container providing audible dosage instructions in a voice recognizable to the user, so that a user, even with a sight or like disability, can rely on voice recognition as providing verification of the accuracy and particular appropriateness of the dosage instructions to the user of the medicine container.

1 Claim, 1 Drawing Sheet

MEDICINE CONTAINER FOR INDICATING PATIENT INFORMATION

This application is a c-i-p of Ser. No. 08/060,336, filed Jul. 1, 1993, now abandoned.

BACKGROUND OF THE INVENTION

1. Field of the Invention

The present invention relates generally to storage containers and more particularly to medicine storage containers which provide drug dosage, scheduling and other instructional information concerning a particular medication to a patient.

2. Brief Description of the Prior Art

Presently, many different types of medications are accessible to the public for use in treating a variety of medical illnesses. Today many medicines in pill or liquid form are legally obtainable only by prescription of a doctor from a pharmacist following the doctor's dosage instructions. Usually a physician, when treating a patient, provides instruction orally to the patient preparatory to providing a written prescription to be filled by a pharmacist. The prescription typically includes information such as dosage, interval between dosages and other instructions in relation to the ingesting of the particular medicine. This, as well as other information, such as possible adverse side effects, precautions, etc. is provided by the pharmacist on a label which is attached to the container for the patient's use in using the particular medicine. However, a problem arises with such procedures when the patient or purchaser is visually impaired, or otherwise incapable of comprehending medication labels, for example, due to language barriers, reading disorders such as dyslexia or illiteracy, a loss of memory or psychological disorder such as early stage alzheimers, or like disabilities.

The problem, moreover, in many instances is life-threatening since many medicines are toxic if taken in excess and thus not as specifically prescribed by the doctor. Even more important than imparting to such patients the dosage instructions in a form comprehensible to them, is the need to verify that the dosage instructions are accurate and are those intended for the user and, for example, are not intended for a similar appearing medicine container for another medicine of another household family member of the user, being mistakenly used by the user, or a medicine container intermingled with other similar medicine containers and mistakenly returned to the user from a hospital pharmacy or other repository where prescriptions are filled and actually belonging to another patient, and other such circumstances in which the medicine container being used is not that of the user and this mistake goes undetected for the lack of visual inspection or any of the above noted reasons.

Some devices have been developed in order to assist the patient/user in the administration of a particular drug. For example, U.S. Pat. Nos. 4,749,093, 4,753,189 and 5,090,338 disclose medicine bottles which display a sequential numbering of dosage and certain other information visible through the cap of the bottle. However, these prior art devices do not provide any such benefit to the visually impaired or to many individuals who are incapable of comprehending medication labels.

Other types of devices provide an audio alarm or other signal to the patient/user in relation to a particular drug. For example, U.S. Pat. Nos. 4,526,474 and 4,617,557 disclose medicine blister packages which incorporate a clock and signal emitter so as to indicate to the patient when a dosage of medication should be taken. In addition, in U.S. Pat. No. 4,847,597 a medicine bottle is disclosed which elicits an audible alarm when the cap of the bottle is removed. However, such prior art devices do not provide any detailed dosage, warning and other instructional information, such as that which is usually provided via a medication label.

SUMMARY OF THE INVENTION

Broadly, it is an object of the present invention to provide a medicine container that is patient-friendly to an extent overcoming the foregoing and other shortcomings of the prior art irrespective of the possible noted disabilities of the user.

More particularly, it is an object to provide a medicine container with audible dosage instructions comprehensible even to a user with a sight or like disability and which, even more importantly provides verification of the accuracy and particular appropriateness of the dosage instructions to the user of the medicine container, all as will be better understood as the description proceeds.

The aforesaid and other objects and advantages of this invention will become more apparent when taken into consideration with the following description and attached drawings.

DETAILED DESCRIPTION OF THE PREFERRED EMBODIMENT

Figure 1:
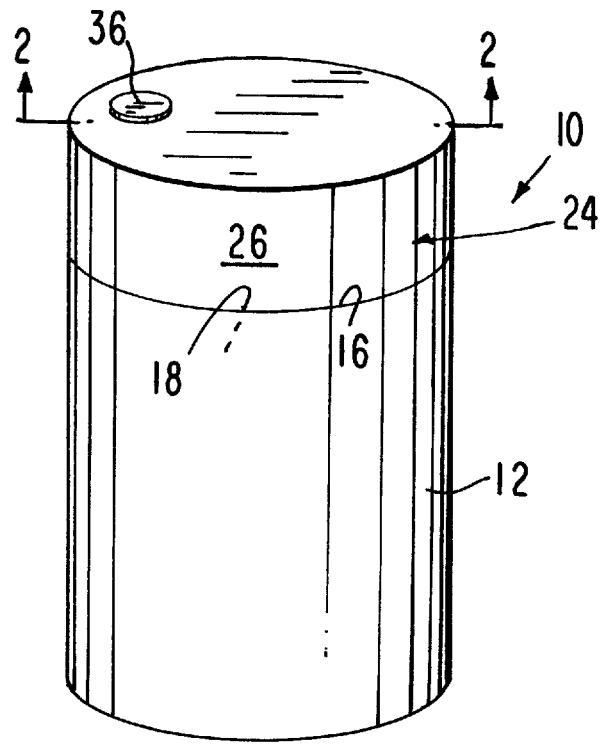
FIG. 1 is a perspective view of a preferred embodiment of a medicine container according to the present invention.
Figure 2:
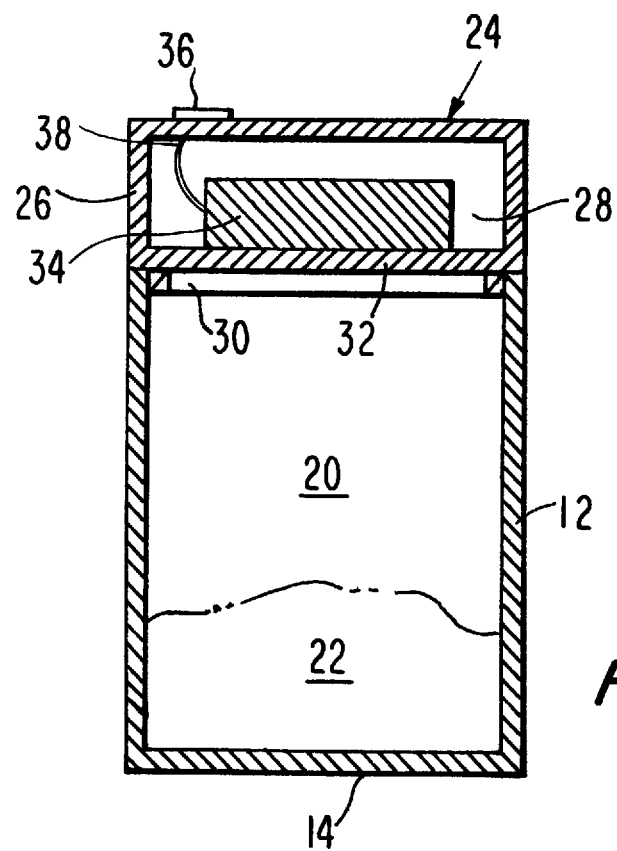
FIG. 2 is a sectional elevational view of the medicine container of FIG. 1 taken along the line 2—2.

The present invention is concerned with a medicine container, generally designated 10, constructed and having an operating mode of use which significantly obviates adverse consequences of taking or orally ingesting the medicine other than as specifically prescribed, both as to amounts and time intervals, of a doctor having a doctor/patient relationship with the user of the medicine container 10. Thus, while some medicines are taken as needed in the discretion of the user, the medicine herein involved will be understood to be of the type that might be harmful to the health of the user if not taken precisely as prescribed.

In accordance with the present invention and to the end of achieving the objective noted, medicine container 10 preferably is of plastic construction material having a body formed of a cylindrical wall 12 closed at its bottom, as at 14, and having an upper edge 16 bounding an opening 18 into a storage compartment 20 for medicine denoted generally at 22, typically in pill or capsule form, to be orally ingested by the user according to prescription, i.e. in prescribed amounts at prescribed times.

Serving as a closure for the compartment 20 is a hollow cap 24 having a cylindrical wall 26 sized to seat on the container edge 16 and bounds a compartment 28 and further has a depending peripheral projection 30 providing a friction fit within the container opening 18.

Before closing compartment 28 with an adhesively secured bottom disc 32 or by other appropriate method of affixation, there is adhesively or otherwise appropriately secured in position within compartment 28 a known sound-recording and sound-producing device 34, as exemplified by such device described and illustrated FIGS. 4 and 5 in U.S. Pat. No. 5,291,191 issued to Don L. Moore on Mar. 1, 1994 for "Medicine Dispenser", which by this reference is incorporated herein in its entirety. Cooperating with the device 34 is a known button switch 36 operatively effective via an electrical connection 38 to cause the operation of the recording and the play back functions of the device 34.

In preparation for use of the medicine container 10, either speaking through the cap wall 26 or through the bottom disc 32 of the removed cap 24, either procedure being understood to be effective for recording in conjunction with operating the button 36, the message being spoken for recording the device 34, it is contemplated will be in his/her own voice of the user of the medicine container 10 and that the content of the recorded message will be prescribed dosage instructions. If needed, the possibly sight-impaired user at the time of the recording can use enhanced lighting or magnifying means while reading in the prescription dosage. Alternatively, the recording can be made by an individual selected on the basis of the recorded voice being recognizable to the user, such as a family member, the doctor providing the dosage instructions with whom the user has had oral communications sufficient for voice-recognition, or other such individual with a voice recognizable to the user.

In the recording preparation of device 34 for use in accordance with the present invention, what is eschewed is a recording made in a synthesized voice, or using digitized technology, or in a voice unfamiliar to the user such as that of an individual who is a stranger to the user as would be an employee of the manufacturer of the medicine, or that of an employee of a pharmacy filling the prescription and returning the medicine container 10 to the user, or other such circumstance in which there would be lacking voice recognition in the audible broadcast of the dosage instructions.

Incident to use, the user will actuate the button 36 causing the medicine container 10 with the stored medicine 22 in place within the storage compartment 20 and readily available for ingesting use, to produce audible dosage instructions that were prerecorded as a result of the playback operation of the device 34, and such dosage instructions will not only be comprehensible to the user who will then be able to follow these dosage instructions, but also said played back recording being in a voice recognizable to the user, as distinguished, for example, from a synthesized voice, will serve as assurance to the user of the accuracy and particular appropriateness of the dosage instructions to the user of the medicine container 10.

It is to be understood that this invention is not limited to the particular embodiment disclosed, but that the disclosure is intended to cover all modifications which are within the scope and spirit of the invention as defined by the appended claims.

What is claimed is:

1. A method of instructing a patient in the use of a medicine of a type that is prescribed to be taken in selected doses at selected intervals and is toxic if taken otherwise than as prescribed, said instruction method comprising the steps of storing said medicine in a container for convenient access thereto by a user, selecting a voice for recording dosage instructions that is recognizable to said user to a voice that is confined to the voice of the user, the voice of an individual with whom the user has had prior oral communication, and the voice of an individual with whom the user has a doctor-patient relationship, prerecording in said selected voice on a sound-recording means disposed on said container preselected dosage instructions for the ingesting of said stored medicine, and causing the operation of said sound-recording means incident to producing a play back of said dosage instructions in said prerecorded voice selected to be recognizable to the user, whereby said voice recognition contributes to verification that the dosage instructions for said medicine is as prescribed.

* * * * *

(12) EX PARTE REEXAMINATION CERTIFICATE (6026th)
United States Patent
Weiss et al.

(10) Number: US 5,846,089 C1
(45) Certificate Issued: Dec. 4, 2007

(54) MEDICINE CONTAINER FOR INDICATING PATIENT INFORMATION

(76) Inventors: Richard C. Weiss, Eight Forrest Rd., Randolph, NJ (US) 07869; Howard L. Terriss, 2 Rectory La., Scarsdale, NY (US) 10583

Reexamination Request:
No. 90/007,413, Feb. 7, 2005

Reexamination Certificate for:
Patent No.: 5,846,089
Issued: Dec. 8, 1998
Appl. No.: 08/612,386
Filed: Mar. 7, 1996

Related U.S. Application Data

(63) Continuation-in-part of application No. 08/060,336, filed on Jul. 1, 1993, now abandoned.

(51) Int. Cl.
*G09B 25/00* (2006.01)
*G09B 5/04* (2006.01)
*G09B 25/08* (2006.01)

(52) U.S. Cl. .................. 434/365; 340/692; 434/319
(58) Field of Classification Search ................ 116/200; 206/232, 459.1, 459.5, 534; 221/3; 340/568.1, 340/686.1, 692; 434/319, 365
See application file for complete search history.

(56) References Cited

U.S. PATENT DOCUMENTS

| | | | |
|---|---|---|---|
| 5,387,108 A | | 2/1995 | Crowell .................. 434/319 |
| 5,577,918 A | * | 11/1996 | Crowell .................. 434/319 |
| 5,846,089 A | | 12/1998 | Weiss et al. ............. 434/365 |
| 5,852,803 A | | 12/1998 | Ashby, III et al. ......... 704/270 |

* cited by examiner

*Primary Examiner*—Jimmy G. Foster

(57) ABSTRACT

A medicine container providing audible dosage instructions in a voice recognizable to the user, so that a user, even with a sight or like disability, can rely on voice recognition as providing verification of the accuracy and particular appropriateness of the dosage instructions to the user of the medicine container.

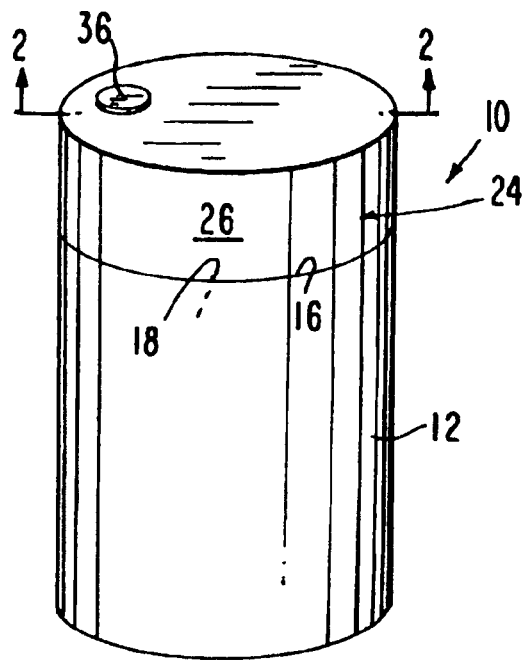

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

\* \* \* \* \*